US012170881B2

(12) United States Patent
Kodama

(10) Patent No.: US 12,170,881 B2
(45) Date of Patent: Dec. 17, 2024

(54) MULTICHANNEL AUDIO SYSTEM, ACOUSTIC PROFILE INFORMATION GENERATING DEVICE, WIRELESS RECORDING PLAYBACK DEVICE, PROGRAM, AND METHOD FOR GENERATING ACOUSTIC PROFILE INFORMATION

(71) Applicant: D&M Holdings, Inc., Kanagawa (JP)

(72) Inventor: Sho Kodama, Kanagawa (JP)

(73) Assignee: D&M HOLDINGS, INC., Kanagawa (JP)

( * ) Notice: Subject to any disclaimer, the term of this patent is extended or adjusted under 35 U.S.C. 154(b) by 0 days.

(21) Appl. No.: 17/779,597

(22) PCT Filed: Sep. 29, 2020

(86) PCT No.: PCT/JP2020/036830
§ 371 (c)(1),
(2) Date: May 25, 2022

(87) PCT Pub. No.: WO2021/106355
PCT Pub. Date: Jun. 3, 2021

(65) Prior Publication Data
US 2023/0007422 A1    Jan. 5, 2023

(30) Foreign Application Priority Data
Nov. 28, 2019    (JP) .................................. 2019-215799

(51) Int. Cl.
*H04S 7/00*    (2006.01)
*H04R 5/04*    (2006.01)
(52) U.S. Cl.
CPC .............. *H04S 7/301* (2013.01); *H04R 5/04* (2013.01); *H04R 2420/07* (2013.01)

(58) Field of Classification Search
CPC ........ H04S 7/301; H04R 5/04; H04R 2420/07
(Continued)

(56) References Cited

U.S. PATENT DOCUMENTS

| 4,641,208 A | 2/1987 | Inazawa et al. |
| 5,255,322 A | 10/1993 | Farinelli et al. |

(Continued)

FOREIGN PATENT DOCUMENTS

| JP | 2000-354300 | 12/2000 |
| JP | 2002-367290 | 12/2002 |

(Continued)

*Primary Examiner* — Paul Kim
(74) *Attorney, Agent, or Firm* — Nieves IP Law Group, LLC; Peter A. Nieves

(57) ABSTRACT

[Problem] To generate acoustic profile information using a simple operation and without increasing the cost of a multichannel audio device. [Solution] A wireless recording playback terminal 5 is positioned at a listening point of a multichannel audio device 2 as a measuring microphone. The wireless recording playback terminal 5 records, as channel playback data in accordance with a test signal playback command received from the multichannel audio device 2, a test signal outputted from a speaker 3 that corresponds to the channel designated by the command. The wireless recording playback terminal 5 also plays back the sound source of the test signal and records the played-back sound source as sound source playback data without being outputted to the outside from the speaker. An acoustic profile information generation server 4 compares these playback data to measure the delay time and attenuation rate of the channel playback data with respect to the sound source playback data, generates the acoustic profile information of the designated channel on the basis of the result of this measurement, and sets the generated acoustic profile information to the multichannel audio device 2.

20 Claims, 9 Drawing Sheets

(58) Field of Classification Search
USPC .......................................................... 381/303
See application file for complete search history.

(56) References Cited

U.S. PATENT DOCUMENTS

| | | | |
|---|---|---|---|
| 5,606,624 | A | 2/1997 | Damato |
| 6,574,592 | B1 | 6/2003 | Nankawa et al. |
| 7,068,972 | B2 | 6/2006 | Tarr |
| 7,346,512 | B2 | 3/2008 | Li-Chun Wang et al. |
| 7,394,519 | B1 | 7/2008 | Mossman et al. |
| 8,290,172 | B2 | 10/2012 | Langella |
| 8,699,862 | B1 | 4/2014 | Sharifi et al. |
| 9,106,192 | B2 | 8/2015 | Sheen et al. |
| 9,219,460 | B2 | 12/2015 | Bush |
| 9,654,891 | B2 | 5/2017 | Murrells et al. |
| 9,690,271 | B2 | 6/2017 | Sheen et al. |
| 9,690,539 | B2 | 6/2017 | Sheen et al. |
| 9,706,323 | B2 | 7/2017 | Sheen |
| 9,772,817 | B2 | 9/2017 | Jarvis et al. |
| 9,781,532 | B2 | 10/2017 | Sheen |
| 9,794,710 | B1 | 10/2017 | Sheen |
| 9,913,057 | B2 | 3/2018 | Sheen et al. |
| 9,961,463 | B2 | 5/2018 | Wilberding et al. |
| 10,003,899 | B2 | 6/2018 | Hartung et al. |
| 10,063,983 | B2 | 8/2018 | Hartung |
| 10,127,006 | B2 | 11/2018 | Sheen |
| 10,372,406 | B2 | 8/2019 | Wilberding et al. |
| 2005/0273326 | A1 | 12/2005 | Padhi et al. |
| 2007/0133810 | A1* | 6/2007 | Kishi .................... H04S 7/301 381/17 |
| 2007/0239699 | A1 | 10/2007 | Murrells et al. |
| 2008/0242222 | A1 | 10/2008 | Bryce et al. |
| 2009/0088978 | A1 | 4/2009 | Ishikawa et al. |
| 2009/0169032 | A1 | 7/2009 | Choi |
| 2009/0216855 | A1 | 8/2009 | Lang et al. |
| 2010/0070987 | A1 | 3/2010 | Amento et al. |
| 2010/0093393 | A1 | 4/2010 | Graef |
| 2010/0315480 | A1 | 12/2010 | Kahn |
| 2010/0333163 | A1 | 12/2010 | Daly |
| 2011/0078729 | A1 | 3/2011 | LaJoie et al. |
| 2012/0099594 | A1 | 4/2012 | Lau et al. |
| 2012/0239175 | A1 | 9/2012 | Mohajer et al. |
| 2013/0331087 | A1 | 12/2013 | Shoemaker et al. |
| 2013/0343568 | A1 | 12/2013 | Mayman et al. |
| 2014/0146980 | A1 | 5/2014 | Jacobs |
| 2014/0242913 | A1 | 8/2014 | Pang |
| 2014/0254820 | A1 | 9/2014 | Gärdenfors et al. |
| 2014/0274031 | A1 | 9/2014 | Menendez |
| 2014/0280450 | A1 | 9/2014 | Luna |
| 2014/0283140 | A1 | 9/2014 | Gorman et al. |
| 2014/0334669 | A1 | 11/2014 | Acharya |
| 2015/0186511 | A1 | 7/2015 | Trollope et al. |
| 2015/0195649 | A1 | 7/2015 | Vogt |
| 2016/0021412 | A1 | 1/2016 | Zito, Jr. |
| 2016/0219012 | A1 | 7/2016 | Liao et al. |
| 2017/0034579 | A1 | 2/2017 | Caudell |

FOREIGN PATENT DOCUMENTS

| | | |
|---|---|---|
| JP | 2007-135094 | 5/2007 |
| JP | 2007259391 | 10/2007 |
| WO | WO2018123612 | 5/2018 |

* cited by examiner

MULTICHANNEL AUDIO SYSTEM, ACOUSTIC PROFILE INFORMATION GENERATING DEVICE, WIRELESS RECORDING PLAYBACK DEVICE, PROGRAM, AND METHOD FOR GENERATING ACOUSTIC PROFILE INFORMATION

CROSS-REFERENCE TO RELATED APPLICATIONS

This application is the national stage of International Application No. PCT/JP2020/036830, filed Sep. 29, 2020, entitled "Multichannel audio system, acoustic profile information generating device, wireless recording playback device, program, and method for generating acoustic profile information" which claims the benefit of Japanese Patent Application serial number 2019-215799, filed Nov. 28, 2019, both of which are incorporated by reference herein in their entirety.

TECHNICAL FIELD

The present invention relates to a technology for generating acoustic profile information to be used for reproducing a multi-channel audio signal through use of a plurality of speakers.

BACKGROUND ART

There is known a multi-channel audio device that reproduces a multi-channel audio signal through use of a plurality of speakers. For example, a multi-channel audio device as described in Patent Literature 1 amplifies an audio signal for each channel of a multi-channel audio signal, and outputs the audio signal from a speaker corresponding to this channel.

In addition, some multi-channel audio devices enable acoustic profile information (including a reproduction timing and a volume level) on an audio signal to be set for each channel of the multi-channel audio signal. For example, a multi-channel audio device as described in Patent Literature 2 collects, for each channel of a multi-channel audio signal, sound of a test signal output from a speaker corresponding to this channel by a dedicated measurement microphone installed at a listening point, and measures a delay time and an attenuation rate of the sound. Then, the acoustic profile information is set for each channel of the multi-channel audio signal so that the audio signal output from the speaker corresponding to this channel is optimized at the listening point.

CITATION LIST

Patent Literature

[PTL 1] JP 2002-367290 A
[PTL 2] JP 2000-354300 A

SUMMARY OF INVENTION

Technical Problem

However, a dedicated measurement microphone is required to be attached to such a related-art multi-channel audio device capable of setting acoustic profile information for each channel of a multi-channel audio signal as described in Patent Literature 2. In addition, the multi-channel audio device itself measures a delay time and an attenuation rate and generates acoustic profile information based on results of that measurement, and hence the multi-channel audio device is required to have a processing capability required for that purpose. For those reasons, a cost of the multi-channel audio device increases. It is also required to connect a dedicated measurement microphone to the multi-channel audio device by a cord, resulting in troublesome work.

The present invention has been made in view of the above-mentioned circumstances, and an object thereof is to provide a technology capable of generating acoustic profile information on a multi-channel audio signal by a simple operation without increasing a cost of a multi-channel audio device.

Solution to Problem

In order to solve the above-mentioned problems, according to one embodiment of the present invention, a wireless recording and reproducing device provided with a recording and reproducing function, such as a smart speaker, a smartphone, or a tablet PC, is placed as a measurement microphone at a listening point of a multi-channel audio device. The wireless recording and reproducing device includes a source sound of a test signal. When a test signal reproducing instruction accompanied by designation of a channel is received from the multi-channel audio device, the wireless recording and reproducing device records, as channel reproduction data, the test signal output from the multi-channel audio device through a speaker corresponding to this designated channel. Further, the wireless recording and reproducing device reproduces the source sound of the test signal and records this reproduced source sound as source sound reproduction data without externally outputting this reproduced source sound from the speaker. Then, the wireless recording and reproducing device transmits the channel reproduction data and the source sound reproduction data on the designated channel to an acoustic profile information generating device. In response thereto, the acoustic profile information generating device compares the channel reproduction data and the source sound reproduction data to each other to measure a delay time and an attenuation rate of the channel reproduction data with respect to the source sound reproduction data. Then, the acoustic profile information generating device generates acoustic profile information including a reproduction timing and a volume level of the designated channel based on results of the measurement, and sets the acoustic profile information in the multi-channel audio device.

For example, according to one embodiment of the present invention, there is provided a multi-channel audio system including: a multi-channel audio device configured to reproduce a multi-channel audio signal through use of a plurality of speakers; an acoustic profile information generating device configured to generate acoustic profile information to be set in the multi-channel audio device; and a wireless recording and reproducing device configured to cooperate with the acoustic profile information generating device, the wireless recording and reproducing device being placed at a listening point of the multi-channel audio device. The wireless recording and reproducing device includes: channel reproduction data recording means for enabling, when a test signal reproducing instruction accompanied by designation of a channel is received from the multi-channel audio device, a microphone provided to or connected to the own wireless recording and reproducing device to start sound collection, and recording, as channel reproduction data on the designated channel, a test signal output from the multi-channel audio device through one of the plurality of speakers corresponding to the designated channel; source sound reproduction data recording means for reproducing, when the test signal reproducing instruction is received, a source sound of the test signal, which is stored in advance, in synchronization with the start of the sound collection by the microphone, and recording reproduced data on the source sound as source sound reproduction data without externally outputting the reproduced data; and measurement data transmission means for transmitting, to the acoustic profile information generating device, measurement data on the designated channel, which includes the channel reproduction data on the designated channel, which has been recorded by the channel reproduction data recording means, and the source sound reproduction data recorded by the source sound reproduction data recording means. The acoustic profile information generating device includes: measurement data receiving means for receiving the measurement data on the designated channel from the wireless recording and reproducing device; measurement means for comparing the channel reproduction data and the source sound reproduction data that are included in the measurement data on the designated channel, which has been received by the measurement data receiving means, to each other to measure a delay time and an attenuation rate of the channel reproduction data on the designated channel with respect to the source sound reproduction data; acoustic profile information generating means for generating acoustic profile information on the designated channel, which includes a reproduction timing and a volume level, based on the delay time and the attenuation rate of the channel reproduction data on the designated channel with respect to the source sound reproduction data, which have been measured by the measurement means; and acoustic profile information transmitting means for transmitting the acoustic profile information on the designated channel, which has been generated by the acoustic profile information generating means, to the multi-channel audio device. The multi-channel audio device includes: acoustic profile information receiving means for receiving the acoustic profile information on the designated channel from the acoustic profile information generating device; acoustic profile information setting means for setting the acoustic profile information on the designated channel, which has been received by the acoustic profile information receiving means, as a reproduction condition for an audio signal of the designated channel; test signal reproduction instruction means for transmitting, based on a test signal reproducing operation received from a user, the test signal reproducing instruction accompanied by the designation of the channel to the wireless recording and reproducing device; and test signal reproduction means for reproducing, based on the test signal reproducing operation, the source sound of the test signal, which is stored in advance, and outputting the source sound from the one of the plurality of speakers corresponding to the designated channel.

Advantageous Effects of Invention

According to the present invention, the wireless recording and reproducing device provided with the recording and reproducing function, such as a smart speaker, a smartphone, or a tablet PC, is used as the measurement microphone, and hence a dedicated measurement microphone is not required to be attached to the multi-channel audio device. It also suffices that the user places the wireless recording and reproducing device to be used as the measurement microphone at the listening point of the multi-channel audio device, and the user is not required to connect the wireless recording and reproducing device and the multi-channel audio device to each other by a cord. In addition, the acoustic profile information is generated by the acoustic profile information generating device provided separately from the multi-channel audio device, and hence the multi-channel audio device is not required to have a processing capability required for generating the acoustic profile information.

Therefore, according to the present invention, it is possible to generate the acoustic profile information on the multi-channel audio signal by a simple operation without increasing the cost of the multi-channel audio device.

DESCRIPTION OF EMBODIMENTS

Now, one embodiment of the present invention is described with reference to the drawings.

Figure 1:
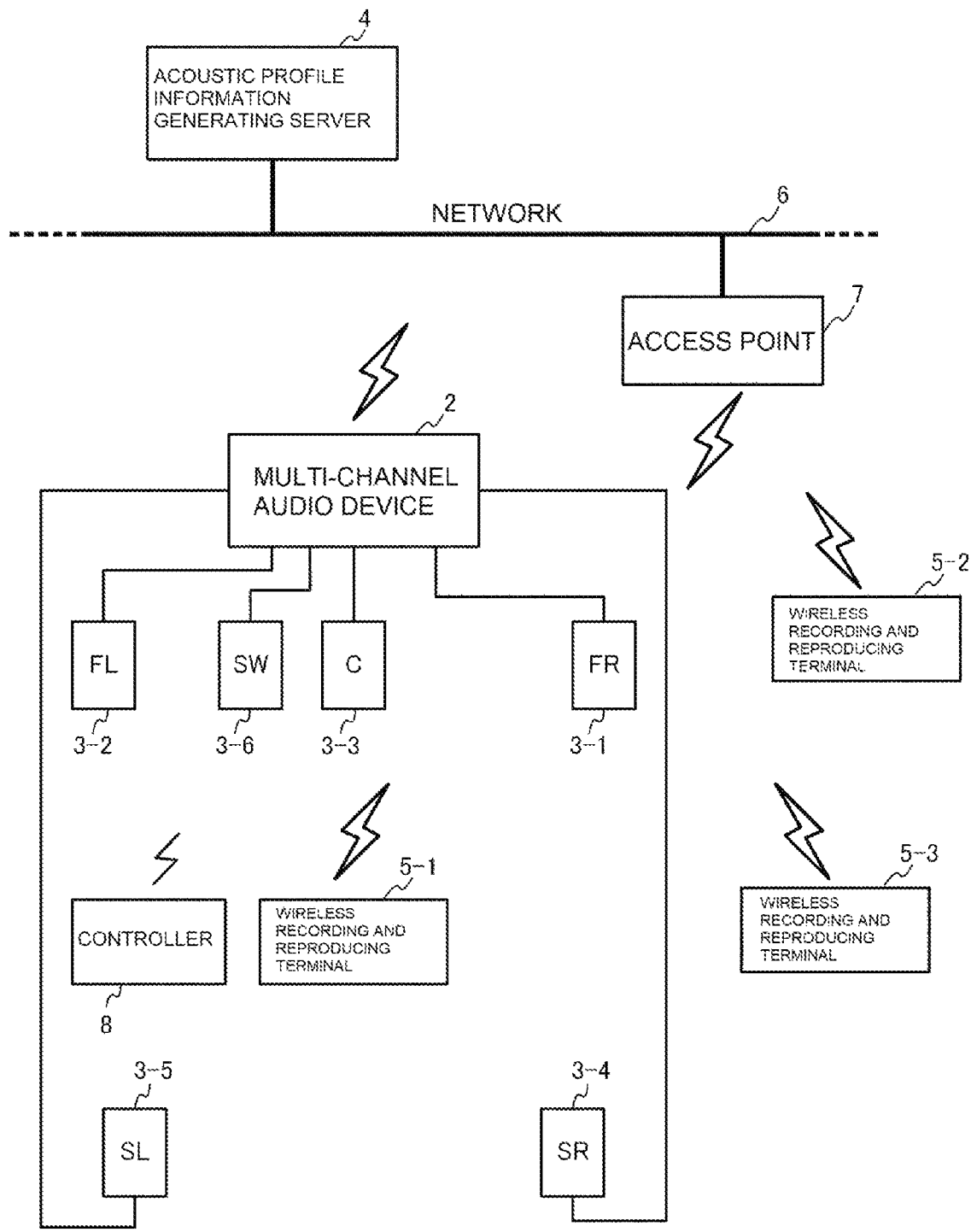
FIG. 1 is a schematic configuration diagram of a multi-channel audio system (1) according to one embodiment of the present invention.

FIG. 1 is a schematic configuration diagram of a multi-channel audio system 1 according to this embodiment.

As illustrated in FIG. 1, the multi-channel audio system 1 according to this embodiment includes an acoustic profile information generating server 4 connected to a network 6, such as a WAN or a LAN, and a multi-channel audio device 2 and wireless recording and reproducing terminals 5-1 to 5-3 (hereinafter also referred to simply as "wireless recording and reproducing terminal 5") connected to the network 6 through an access point 7.

The multi-channel audio device 2 reproduces a multi-channel audio signal through use of a plurality of speakers 3-1 to 3-6 (hereinafter also referred to simply as "speakers 3"). In this embodiment, a case of reproducing a multi-channel audio signal of 5.1 channels is illustrated as an example, and the six speakers 3-1 to 3-6 corresponding to a front right (FR) channel, a front left (FL) channel, a center (C) channel, a surround right (SR) channel, a surround left (SL) channel, and a sub-woofer (SW) channel are connected to the multi-channel audio device 2. For each channel of the multi-channel audio signal, the multi-channel audio device 2 reproduces an audio signal based on acoustic profile information generated by the acoustic profile information generating server 4, and outputs the audio signal from the speaker 3 corresponding to this channel. The multi-channel audio device 2 is also provided with a controller 8 for remotely operating the multi-channel audio device 2 by short-range wireless communication, such as Infrared Data Association (IrDA) or Bluetooth (trademark).

The wireless recording and reproducing terminal 5 is a wireless terminal provided with a recording and reproducing function, such as a smart speaker, a smartphone, or a tablet PC, and can be used as a measurement microphone by cooperating with the acoustic profile information generating server 4. The wireless recording and reproducing terminal 5 to be used as the measurement microphone is placed at a listening point of the multi-channel audio device 2.

The acoustic profile information generating server 4 generates acoustic profile information to be set in the multi-channel audio device 2 based on results of the measurement obtained by the wireless recording and reproducing terminal 5 placed at the listening point of the multi-channel audio device 2 as the measurement microphone.

Figure 2:
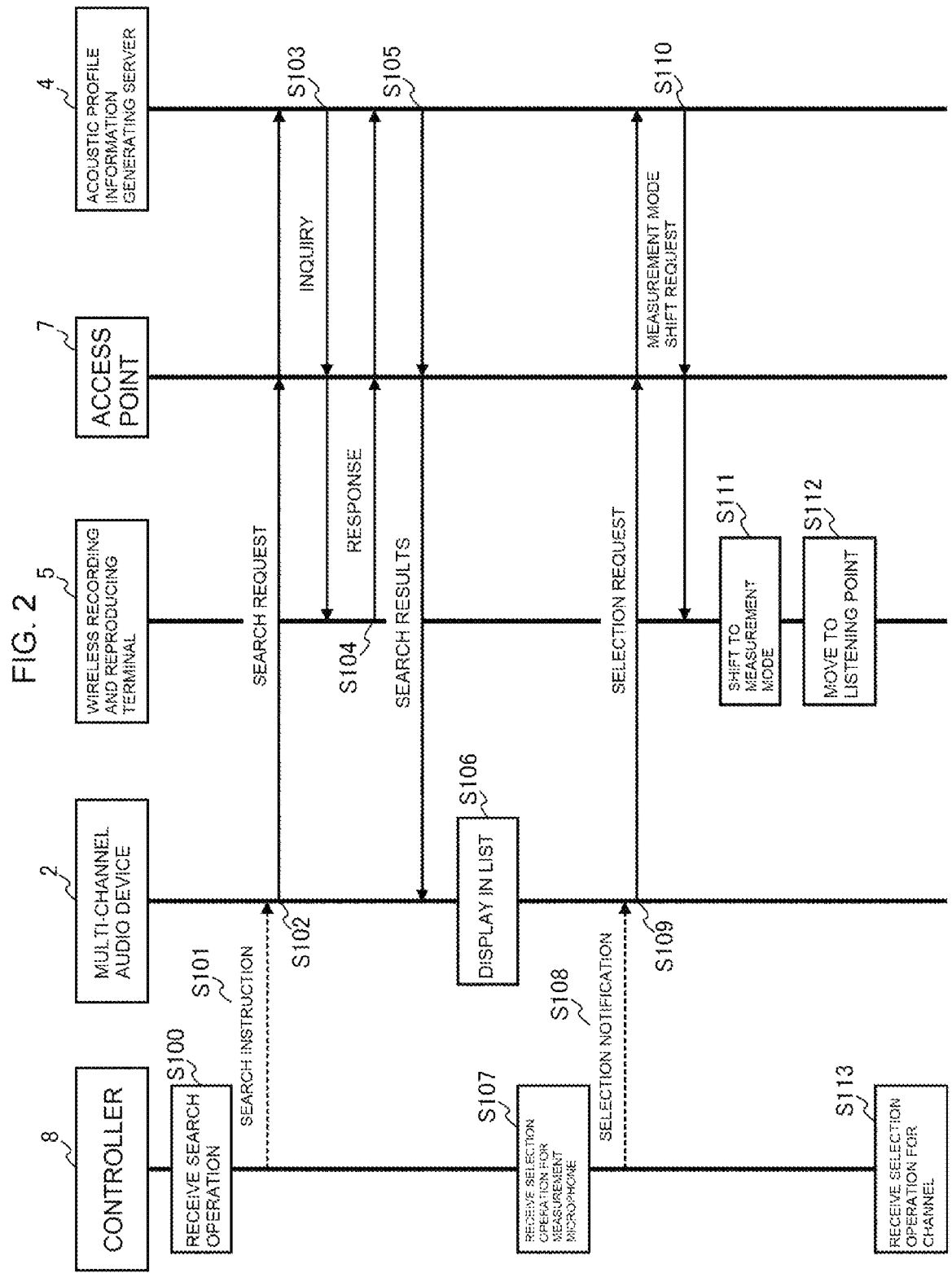
FIG. 2 is a sequence diagram for illustrating an operation of the multi-channel audio system (1).
Figure 3:
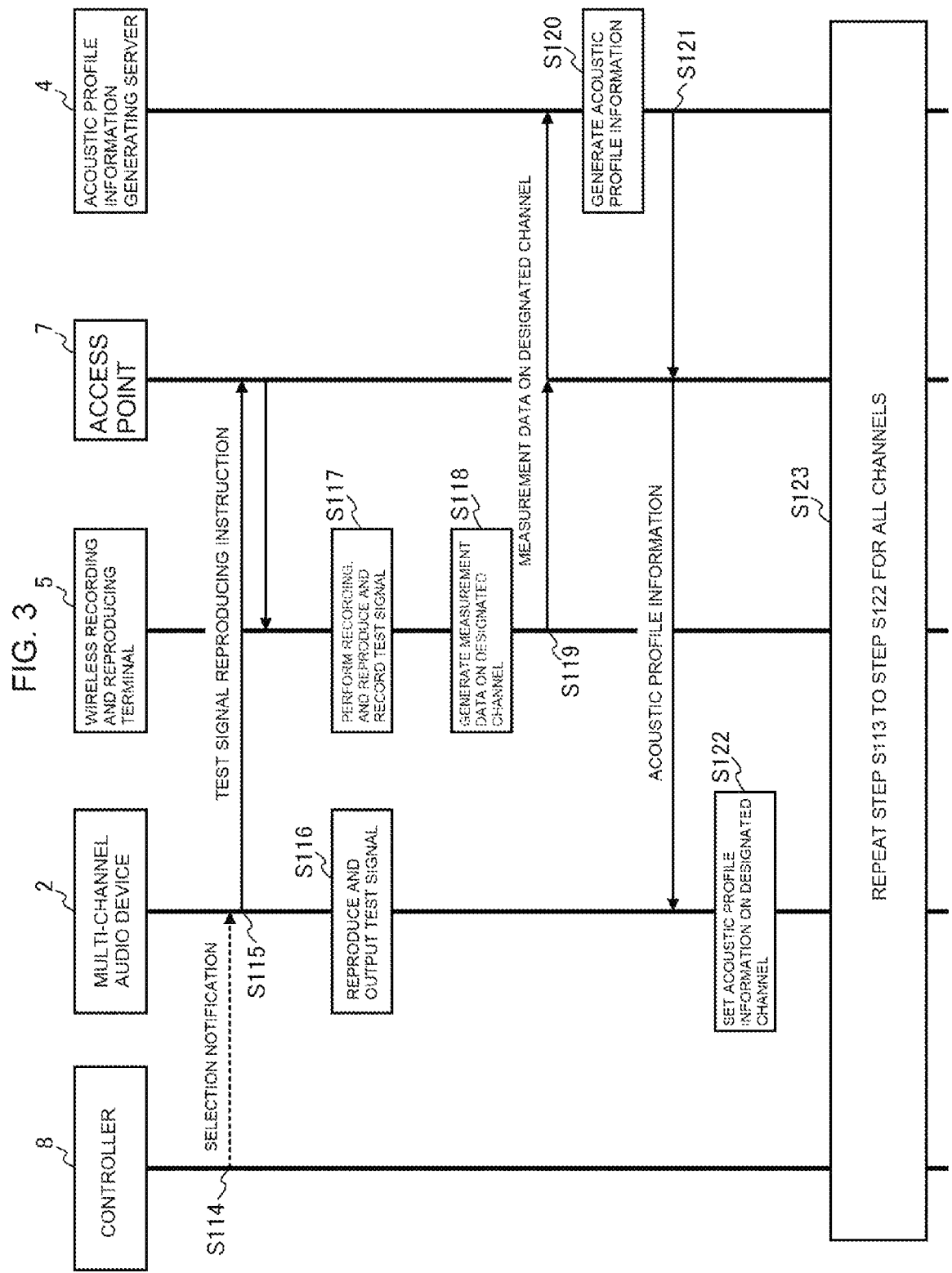
FIG. 3 is a sequence diagram for illustrating the operation of the multi-channel audio system (1), and is a continuation of FIG. 2.

FIG. 2 and FIG. 3 are sequence diagrams for illustrating an operation of the multi-channel audio system 1.

First, when the controller 8 receives a search operation for the wireless recording and reproducing terminals 5 that can be used as the measurement microphone from a user (Step S100), the controller 8 transmits a search instruction to the multi-channel audio device 2 (Step S101). In response thereto, the multi-channel audio device 2 transmits a search request to the acoustic profile information generating server 4 through the access point 7 and the network 6 (Step S102).

When the acoustic profile information generating server 4 receives the search request from the multi-channel audio device 2, the acoustic profile information generating server 4 broadcasts an inquiry about the measurement microphone to the network 6 (Step S103). This inquiry is wirelessly transmitted from the access point 7.

Subsequently, when the wireless recording and reproducing terminal 5 receives the inquiry from the acoustic profile information generating server 4, in a case in which the own terminal 5 can be used as the measurement microphone, the wireless recording and reproducing terminal 5 sends a response to the acoustic profile information generating server 4 (Step S104). In this case, it is assumed that all the wireless recording and reproducing terminals 5-1 to 5-3 illustrated in FIG. 1 have sent the response. In response thereto, the acoustic profile information generating server 4 transmits, to the multi-channel audio device 2, search results including information on all the wireless recording and reproducing terminals 5-1 to 5-3 that have sent the response (Step S105).

Subsequently, when the multi-channel audio device 2 receives the search results from the acoustic profile information generating server 4, the multi-channel audio device 2 displays, in a list, the information on the wireless recording and reproducing terminals 5-1 to 5-3 included in the received search results (Step S106), and waits until the wireless recording and reproducing terminal 5 to be used as the measurement microphone is selected by the user through the controller 8.

Subsequently, when the controller 8 receives, from the user, a selection operation for the wireless recording and reproducing terminal 5 to be used as the measurement microphone from among the wireless recording and reproducing terminals 5-1 to 5-3 displayed in the list on the multi-channel audio device (Step S107), the controller 8 transmits a selection notification accompanied by designation of the selected wireless recording and reproducing terminal 5 to the multi-channel audio device 2 (Step S108). In response thereto, the multi-channel audio device 2 transmits a selection request accompanied by the designation of the selected wireless recording and reproducing terminal 5 to the acoustic profile information generating server 4 through the access point 7 and the network 6 (Step S109).

Subsequently, when the acoustic profile information generating server 4 receives the selection request from the multi-channel audio device 2, the acoustic profile information generating server 4 transmits a measurement mode shift request accompanied by designation of the multi-channel audio device 2 that has transmitted the received selection request to the wireless recording and reproducing terminal 5 designated by the received selection request (Step S110).

Subsequently, the wireless recording and reproducing terminal 5 that has received the measurement mode shift request from the acoustic profile information generating server 4 shifts to a measurement mode, and waits until a test signal reproducing instruction is transmitted from the multi-channel audio device 2 designated by the received measurement mode shift request (Step S111). This wireless recording and reproducing terminal 5 is also moved by the user to be placed at the listening point of the multi-channel audio device 2 (Step S112).

FIG. 1 is an illustration of an exemplary case in which the wireless recording and reproducing terminal 5-1 has been selected as the wireless recording and reproducing terminal 5 to be used as the measurement microphone and placed at the listening point of the multi-channel audio device 2.

Subsequently, when the controller 8 receives a selection operation for a channel for reproducing a test signal from the user (Step S113), the controller 8 transmits a selection notification accompanied by designation of the selected channel to the multi-channel audio device 2 (Step S114). In response thereto, the multi-channel audio device 2 transmits a test signal reproducing instruction accompanied by designation of a channel for reproducing the test signal to the wireless recording and reproducing terminal 5-1 operating in the measurement mode through the access point 7 and the network 6 (Step S115). Then, the multi-channel audio device 2 reproduces a source sound of the test signal registered in advance, and outputs the source sound from the speaker 3 corresponding to the channel designated by the test signal reproducing instruction (Step S116).

Meanwhile, when the wireless recording and reproducing terminal 5-1 operating in the measurement mode receives the test signal reproducing instruction from the multi-channel audio device 2, the wireless recording and reproducing terminal 5-1 enables a microphone to start sound collection, and records the test signal output from the multi-channel audio device 2 as channel reproduction data on the channel designated by the test signal reproducing instruction. In synchronization with the start of the sound collection by the microphone, the wireless recording and reproducing terminal 5-1 also reproduces the source sound of the test signal, which is registered in advance, and records the reproduced data as source sound reproduction data without externally outputting the reproduced data (Step S117).

Subsequently, the wireless recording and reproducing terminal 5-1 generates measurement data on the designated channel, which includes the designation of the channel designated by the test signal reproducing instruction, the channel reproduction data, and the source sound reproduction data (Step S118). Then, the wireless recording and reproducing terminal 5-1 transmits the measurement data on the designated channel to the acoustic profile information generating server 4 through the access point 7 and the network 6 (Step S119).

Subsequently, when the acoustic profile information generating server 4 receives the measurement data on the designated channel from the wireless recording and reproducing terminal 5, the acoustic profile information generating server generates acoustic profile information on the designated channel of the received measurement data based on the channel reproduction data and the source sound reproduction data that are included in the received measurement data (Step S120). Specifically, the acoustic profile information generating server 4 compares the channel reproduction data and the source sound reproduction data to each other to measure a delay time and an attenuation rate of the channel reproduction data with respect to the source sound reproduction data. Then, the acoustic profile information generating server 4 generates acoustic profile information on the designated channel, which includes the reproduction timing and the volume level, based on results of this measurement.

Then, the acoustic profile information generating server 4 transmits the acoustic profile information on the designated channel generated in the above-mentioned manner to the multi-channel audio device 2 (Step S121). In response thereto, the multi-channel audio device 2 sets the acoustic profile information on the designated channel, which has been received from the acoustic profile information generating server 4, as a reproduction condition for the audio signal of the designated channel (Step S122).

Then, the processing steps indicated by Step S113 to Step S122 are repeatedly performed for all the channels of the multi-channel audio signal to be reproduced by the multi-channel audio device 2 (Step S123). Thus, the acoustic profile information is set for each channel of the multi-channel audio signal as the reproduction condition for the audio signal of this channel.

Next, details of the multi-channel audio device 2, the acoustic profile information generating server 4, and the wireless recording and reproducing terminal 5, which are included in the multi-channel audio system 1 according to this embodiment, are described.

First, the details of the wireless recording and reproducing terminal 5 are described.

Figure 4:
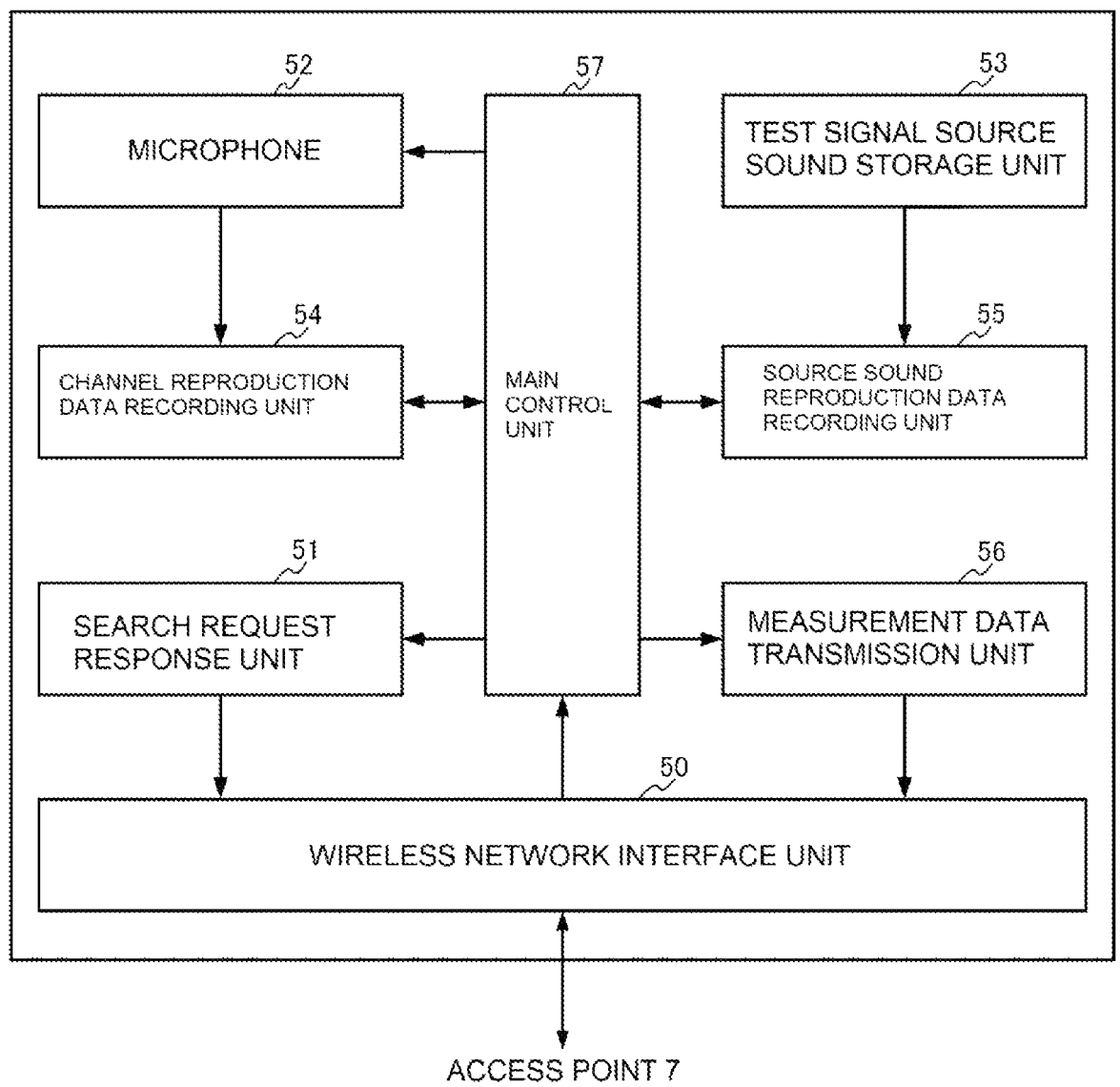
FIG. 4 is a schematic functional configuration diagram of a wireless recording and reproducing terminal (5).

FIG. 4 is a schematic functional configuration diagram of the wireless recording and reproducing terminal 5.

As illustrated in FIG. 4, the wireless recording and reproducing terminal 5 includes a wireless network interface unit 50, a search request response unit 51, a microphone 52, a test signal source sound storage unit 53, a channel reproduction data recording unit 54, a source sound reproduction data recording unit 55, a measurement data transmission unit 56, and a main control unit 57.

The wireless network interface unit 50 is an interface for wireless connection to the access point 7.

The search request response unit 51 sends a response to the inquiry about the measurement microphone, which has been received from the acoustic profile information generating server 4 through the wireless network interface unit 50.

The test signal source sound storage unit 53 stores the same source sound as the source sound of the test signal to be output from the multi-channel audio device 2.

The channel reproduction data recording unit 54 records the test signal having the sound collected by the microphone 52 after being output from any one of the speakers 3 of the multi-channel audio device 2, as the channel reproduction data of the channel corresponding to this speaker 3.

The source sound reproduction data recording unit 55 reproduces the source sound of the test signal stored in the test signal source sound storage unit 53 in synchronization with the start of the sound collection by the microphone 52, and records the reproduced data as the source sound reproduction data.

The measurement data transmission unit 56 generates measurement data on the designated channel, which includes the channel reproduction data recorded by the channel reproduction data recording unit 54, the source sound reproduction data recorded by the source sound reproduction data recording unit 55, and the designation of the channel corresponding to those pieces of reproduced data. Then, the measurement data transmission unit 56 transmits the generated measurement data on the designated channel to the acoustic profile information generating server 4 through the wireless network interface unit 50.

The main control unit 57 centrally controls the respective units 50 to 56 of the wireless recording and reproducing terminal 5.

The functional configuration of the wireless recording and reproducing terminal 5 illustrated in FIG. 4 is implemented by a CPU executing a predetermined program on a smart speaker, a smartphone, a tablet PC, or another mobile computer provided with the CPU, a memory, a flash memory or another auxiliary storage device, a wireless LAN adapter or another communication device, a microphone, and a speaker.

Figure 5:
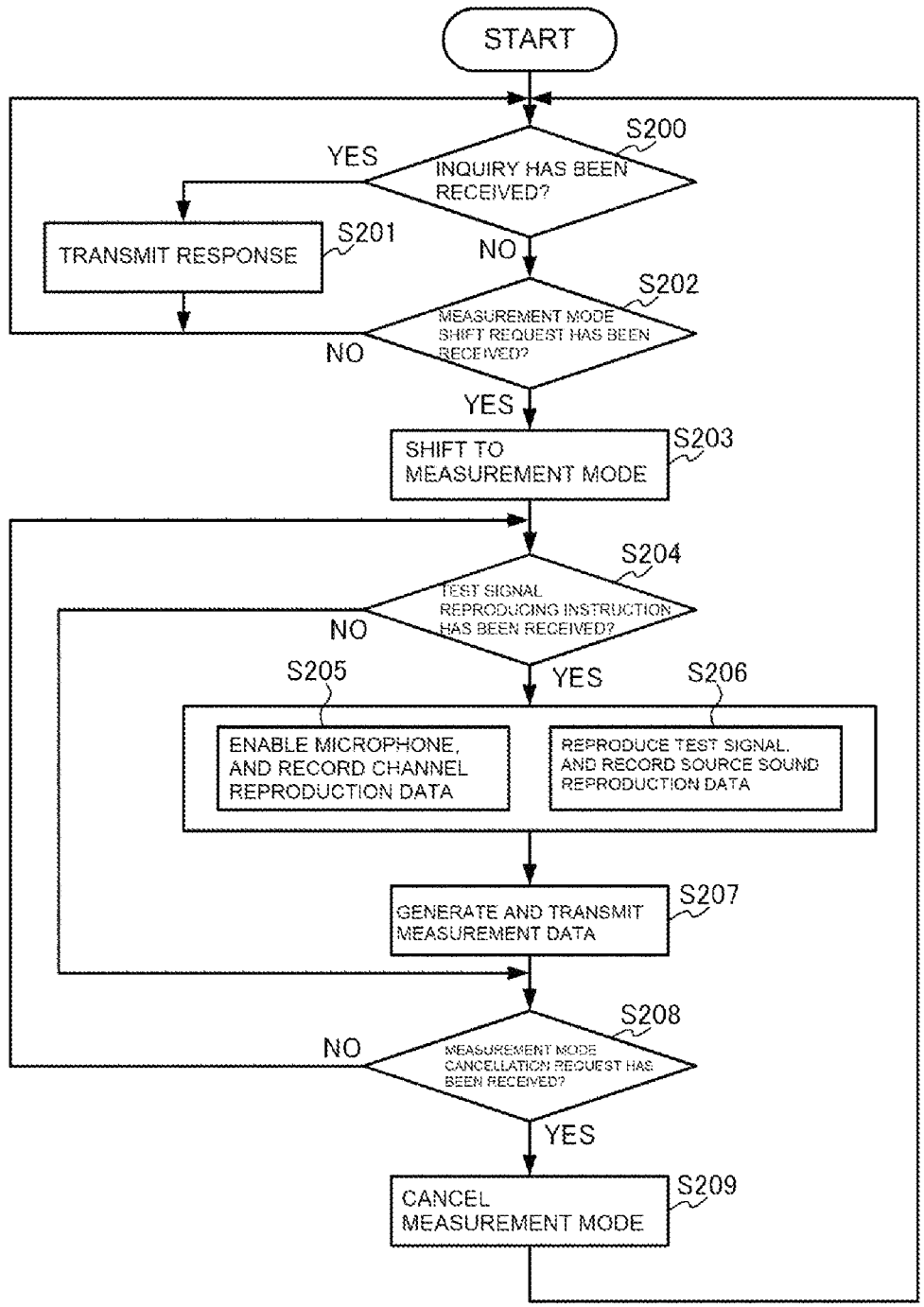
FIG. 5 is a flow chart for illustrating an operation of the wireless recording and reproducing terminal (5).

FIG. 5 is a flow chart for illustrating an operation of the wireless recording and reproducing terminal 5.

When the main control unit 57 receives the inquiry about the measurement microphone from the acoustic profile information generating server 4 through the wireless network interface unit 50 ("YES" in Step S200), the main control unit 57 instructs the search request response unit 51 to respond. In response thereto, the search request response unit 51 transmits a response indicating that the own wireless recording and reproducing terminal 5 can be used as the measurement microphone to the acoustic profile information generating server 4 through the wireless network interface unit 50 (Step S201).

Meanwhile, when the main control unit 57 receives the measurement mode shift request from the acoustic profile information generating server 4 through the wireless network interface unit 50 ("YES" in Step S202), the main control unit 57 shifts to the measurement mode (Step S203), and waits until the test signal reproducing instruction is transmitted from the multi-channel audio device 2 designated by the received measurement mode shift request (Step S204).

Prior to the reception of the measurement mode shift request or after the reception of the measurement mode shift request, the wireless recording and reproducing terminal 5 is moved by the user to be placed at the listening point of the multi-channel audio device 2.

Subsequently, when the main control unit 57 receives the test signal reproducing instruction from the multi-channel audio device 2 designated by the measurement mode shift request through the wireless network interface unit 50 ("YES" in Step S204), the main control unit 57 enables the microphone 52 to instruct the channel reproduction data recording unit 54 to perform recording, and also instructs the source sound reproduction data recording unit 55 to perform reproduction and recording. In response thereto, the channel reproduction data recording unit 54 records the test signal having the sound collected by the microphone 52 after being output from the speaker 3 corresponding to the channel designated by the test signal reproducing instruction in the multi-channel audio device designated by the measurement mode shift request, as the channel reproduction data of the channel (designated channel) corresponding to this speaker 3 (Step S205). Meanwhile, the source sound reproduction data recording unit 55 reproduces the source sound of the test signal stored in the test signal source sound storage unit 53 in synchronization with the start of the sound collection by the microphone 52, and records the reproduced data as the source sound reproduction data (Step S206).

Subsequently, the main control unit 57 passes the channel reproduction data recorded by the channel reproduction data recording unit 54 and the source sound reproduction data recorded by the source sound reproduction data recording unit 55 to the measurement data transmission unit 56 together with the channel designated by the test signal reproducing instruction. In response thereto, the measurement data transmission unit 56 generates measurement data on the designated channel, which includes the channel reproduction data, the source sound reproduction data, and the designation of the channel corresponding to those pieces of reproduced data, and transmits the generated measurement data on the designated channel to the acoustic profile information generating server 4 through the wireless network interface unit 50 (Step S207).

In addition, when the main control unit 57 receives a measurement mode cancellation request from the acoustic profile information generating server 4 through the wireless network interface unit 50 ("YES" in Step S208), the main control unit 57 cancels the measurement mode (Step S209) to end the state of waiting for the test signal reproducing instruction, and the process returns to Step S200.

Next, the details of the acoustic profile information generating server 4 are described.

Figure 6:
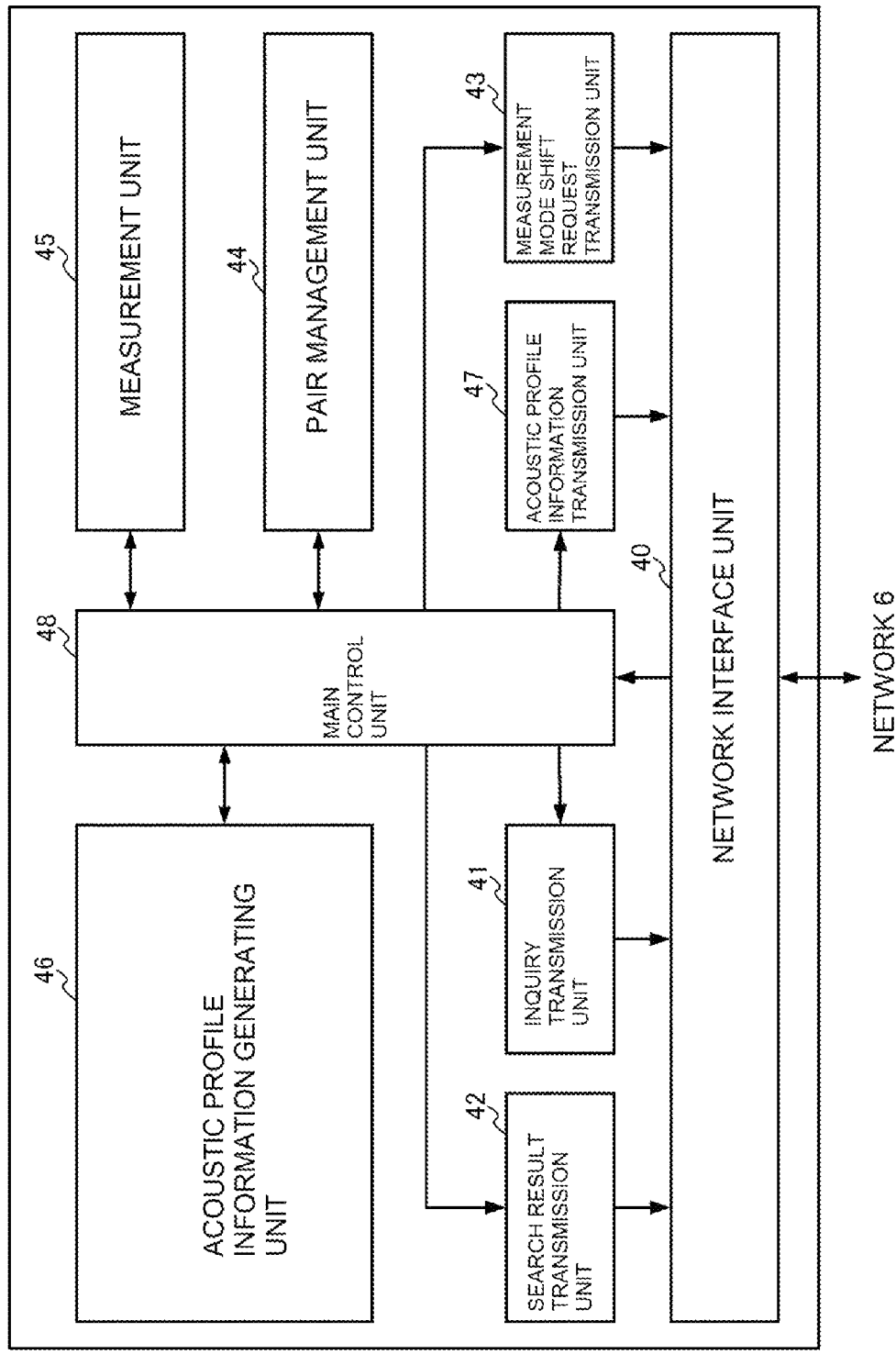
FIG. 6 is a schematic functional configuration diagram of an acoustic profile information generating server (4).

FIG. 6 is a schematic functional configuration diagram of the acoustic profile information generating server 4.

As illustrated in FIG. 6, the acoustic profile information generating server 4 includes a network interface unit 40, an inquiry transmission unit 41, a search result transmission unit 42, a measurement mode shift request transmission unit 43, a pair management unit 44, a measurement unit 45, an acoustic profile information generating unit 46, an acoustic profile information transmission unit 47, and a main control unit 48.

The network interface unit 40 is an interface for connection to the network 6.

The inquiry transmission unit 41 broadcasts the inquiry about the measurement microphone to the network 6 based on the search request received from the multi-channel audio device 2, to thereby search for the wireless recording and reproducing terminals 5 that can communicate to/from the own device 4 and the multi-channel audio device 2 and can be used as the measurement microphone.

The search result transmission unit 42 transmits the search results including information on the wireless recording and reproducing terminals 5 that can be used as the measurement microphone to the multi-channel audio device 2 that has transmitted the search request.

The measurement mode shift request transmission unit 43 transmits, based on the selection request received from the multi-channel audio device 2, the measurement mode shift request accompanied by the designation of the multi-channel audio device 2 that has transmitted the received selection request, to the wireless recording and reproducing terminal 5 designated by the received selection request. The measurement mode shift request transmission unit 43 also transmits, based on a selection cancellation request received from the multi-channel audio device 2, the measurement mode cancellation request to the wireless recording and reproducing terminal 5 designated by the received selection cancellation request.

The pair management unit 44 manages the wireless recording and reproducing terminal 5 designated by the selection request received from the multi-channel audio device 2 in association with the multi-channel audio device 2 that has transmitted the received selection request. The pair management unit 44 also cancels the association between the wireless recording and reproducing terminal 5 designated by the selection cancellation request received from the multi-channel audio device 2 and the multi-channel audio device 2 that has transmitted the received selection cancellation request.

The measurement unit 45 compares the channel reproduction data and the source sound reproduction data that are included in the measurement data on the designated channel, which has been received from the wireless recording and reproducing terminal 5, to each other to measure the delay time and the attenuation rate of the channel reproduction data with respect to the source sound reproduction data.

The acoustic profile information generating unit 46 generates acoustic profile information on the designated channel, which includes the reproduction timing and the volume level, based on the delay time and the attenuation rate of the channel reproduction data on the designated channel with respect to the source sound reproduction data, which have been measured by the measurement unit 45. Specifically, the acoustic profile information generating unit 46 determines the reproduction timing of the designated channel so that the reproduction is to be started earlier than a standard reproduction timing by the delay time, that is, so that a start timing of the test signal in the channel reproduction data matches a start timing of the test signal in the source sound reproduction data. The acoustic profile information generating unit 46 also determines the volume level of the designated channel so that the channel reproduction data on the designated channel has an attenuation rate of "1" with respect to the source sound reproduction data, that is, so that an amplitude of the test signal in the channel reproduction data matches an amplitude of the test signal in the source sound reproduction data.

The acoustic profile information transmission unit 47 transmits the acoustic profile information on the designated channel, which has been generated by the acoustic profile information generating unit 46, to the multi-channel audio device 2 managed by the pair management unit 44 in association with the wireless recording and reproducing terminal 5 that has transmitted the measurement data used for generating this acoustic profile information.

The main control unit 48 centrally controls the respective units 40 to 47 of the acoustic profile information generating server 4.

The functional configuration of the acoustic profile information generating server 4 illustrated in FIG. 6 may be implemented by hardware through use of an integrated logic IC, such as an application specific integrated circuit (ASIC) or a field programmable gate array (FPGA), or may be implemented by software through use of a computer, such as a digital signal processor (DSP). As another example, the functional configuration may be implemented by a general computer, such as a PC, including a CPU, a memory, a flash memory, a hard disk drive, or another auxiliary storage device, and a network interface card (NIC) or another communication device, causing the CPU to load a predetermined program into the memory from the auxiliary storage device and execute the program.

Figure 7:
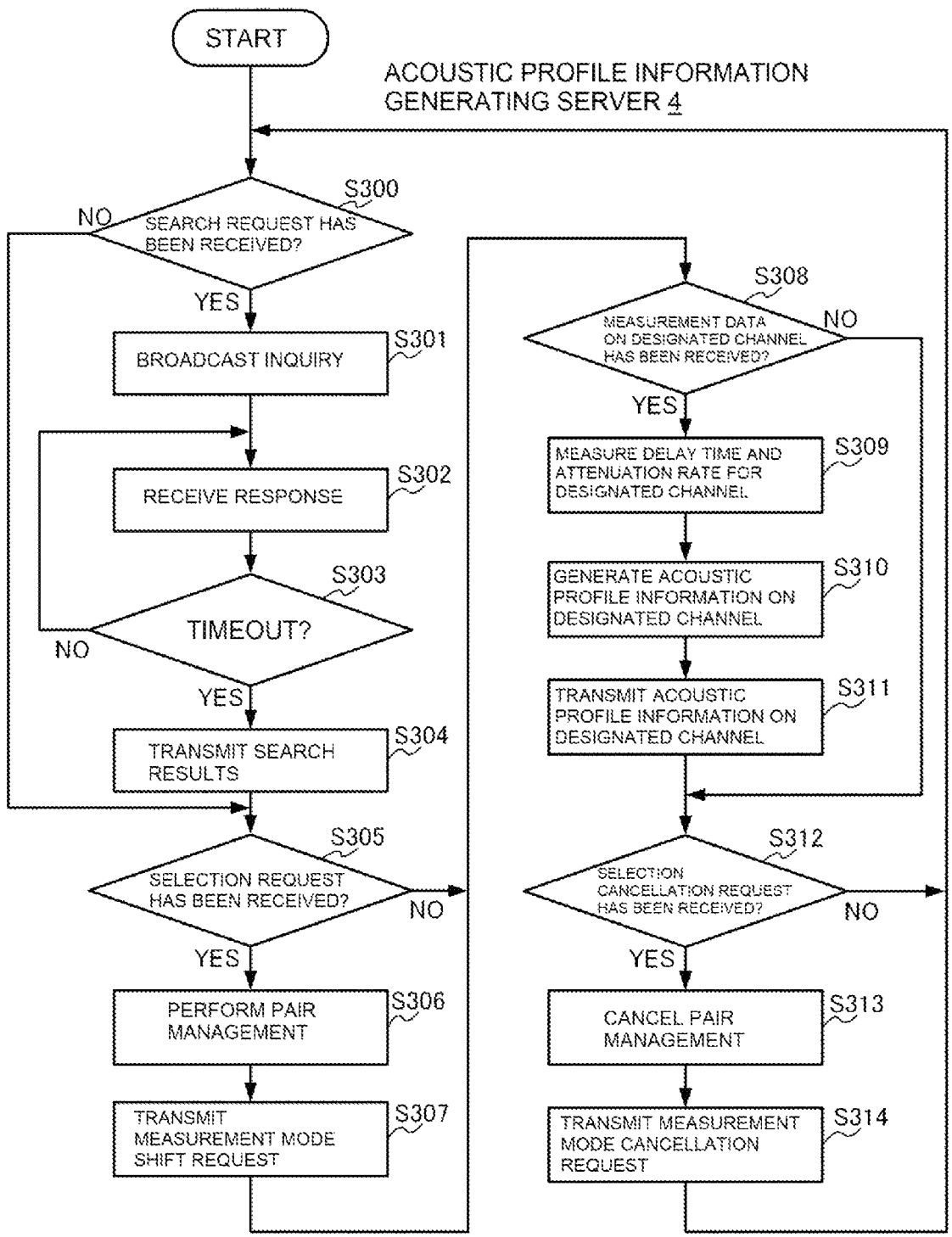
FIG. 7 is a flow chart for illustrating an operation of the acoustic profile information generating server (4).

FIG. 7 is a flow chart for illustrating an operation of the acoustic profile information generating server 4.

When the main control unit 48 receives the search request from the multi-channel audio device 2 through the network interface unit 40 ("YES" in Step S300), the main control unit 48 instructs the inquiry transmission unit 41 to inquire about the measurement microphone. In response thereto, the inquiry transmission unit 41 broadcasts the inquiry about the measurement microphone from the network interface unit 40 to the network 6 (Step S301). This inquiry is broadcast from the access point 7 and received by each of the wireless recording and reproducing terminals 5-1 to 5-3.

Subsequently, the main control unit 48 keeps receiving a response to the inquiry (Step S302) until a timeout occurs due to the lapse of a predetermined time period ("NO" in Step S303). Then, information on the wireless recording and reproducing terminals 5 that have transmitted the responses received before the timeout is passed to the search result transmission unit 42 together with information on the multi-channel audio device 2 that has transmitted the search request. In response thereto, the search result transmission unit 42 transmits the search results including the information on the wireless recording and reproducing terminals 5 received from the main control unit 48 to the multi-channel audio device 2 that has transmitted the search request (Step S304).

Further, when the main control unit 48 receives the selection request from the multi-channel audio device 2 through the network interface unit 40 ("YES" in Step S305), the main control unit 48 passes the information on the wireless recording and reproducing terminal 5 designated by the received selection request to the pair management unit 44 and the measurement mode shift request transmission unit 43 together with the information on the multi-channel audio device 2 that has transmitted the selection request. In response thereto, the pair management unit 44 manages the wireless recording and reproducing terminal 5 designated by the selection request in association with the multi-channel audio device 2 that has transmitted of the selection request (Step S306). In addition, the measurement mode shift request transmission unit 43 transmits the measurement mode shift request accompanied by the designation of the multi-channel audio device 2 that has transmitted the selection request, to the wireless recording and reproducing terminal 5 designated by the selection request (Step S307).

Further, when the main control unit 48 receives the measurement data on the designated channel from the wireless recording and reproducing terminal 5 through the network interface unit 40 ("YES" in Step S308), the main control unit 48 passes the received measurement data to the measurement unit 45. In response thereto, the measurement unit 45 compares the channel reproduction data and the source sound reproduction data that are included in the received measurement data to each other to measure the delay time and the attenuation rate of the channel reproduction data with respect to the source sound reproduction data (Step S309).

Subsequently, the main control unit 48 passes the delay time and the attenuation rate of the channel reproduction data with respect to the source sound reproduction data, which have been measured by the measurement unit 45, to the acoustic profile information generating unit 46 together with the designated channel included in the measurement data. In response thereto, the acoustic profile information generating unit 46 generates acoustic profile information on the designated channel, which includes the reproduction timing and the volume level, based on the delay time and the attenuation rate of the channel reproduction data with respect to the source sound reproduction data (Step S310).

Subsequently, the main control unit 48 passes the acoustic profile information on the designated channel, which has been generated by the acoustic profile information generating unit 46, to the acoustic profile information transmission unit 47 together with the information on the multi-channel audio device 2 managed by the pair management unit 44 in association with the wireless recording and reproducing terminal 5 that has transmitted the measurement data on this designated channel. In response thereto, the acoustic profile information transmission unit 47 transmits the acoustic profile information on the designated channel to the multi-channel audio device 2 managed by the pair management unit 44 in association with the wireless recording and reproducing terminal 5 that has transmitted the measurement data on this designated channel (Step S311).

Further, when the main control unit 48 receives the selection cancellation request from the multi-channel audio device 2 through the network interface unit 40 ("YES" in Step S312), the main control unit 48 passes the information on the multi-channel audio device 2 that has transmitted the received selection cancellation request to the pair management unit 44 and the measurement mode shift request transmission unit 43. In response thereto, the pair management unit 44 cancels the association between the wireless recording and reproducing terminal 5 designated by the selection cancellation request and the multi-channel audio device 2 that has transmitted the selection cancellation request (Step S313). In addition, the measurement mode shift request transmission unit 43 transmits the measurement mode cancellation request to the wireless recording and reproducing terminal 5 designated by the selection cancellation request (Step S314).

Next, the details of the multi-channel audio device 2 are described.

Figure 8:
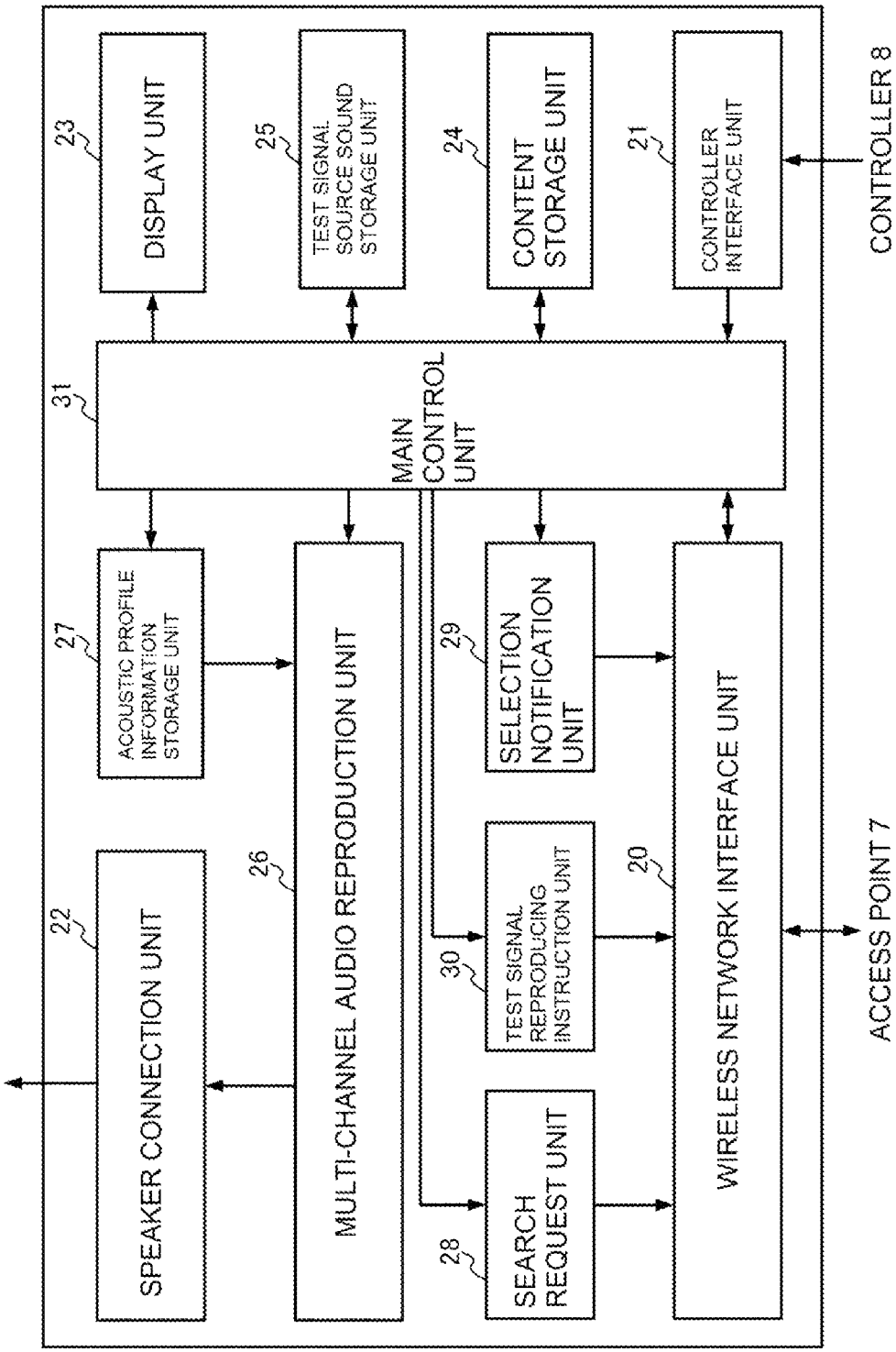
FIG. 8 is a schematic functional configuration diagram of a multi-channel audio device (2).

FIG. 8 is a schematic functional configuration diagram of the multi-channel audio device 2.

As illustrated in FIG. 8, the multi-channel audio device 2 includes a wireless network interface unit 20, a controller interface unit 21, a speaker connection unit 22, a display unit 23, a content storage unit 24, a test signal source sound storage unit 25, a multi-channel audio reproduction unit 26, an acoustic profile information storage unit 27, a search request unit 28, a selection notification unit 29, a test signal reproducing instruction unit 30, and a main control unit 31.

The wireless network interface unit 20 is an interface for wireless connection to the access point 7.

The controller interface unit 21 is an interface for communication to/from the controller 8 by short-range wireless communication, such as Infrared Data Association (IrDA) or Bluetooth (trademark).

The speaker connection unit 22 includes, for each channel, a connection terminal (not shown) for connection to the speaker 3 corresponding to the corresponding channel. In this embodiment, the speaker connection unit 22 includes an FR channel connection terminal for connection to the speaker 3-1 corresponding to the FR channel, an FL channel connection terminal for connection to the speaker 3-2 corresponding to the FL channel, a C channel connection terminal for connection to the speaker 3-3 corresponding to the C channel, an SR channel connection terminal for connection to the speaker 3-4 corresponding to the SR channel, an SL channel connection terminal for connection to the speaker 3-5 corresponding to the SL channel, and an SW channel connection terminal for connection to the speaker 3-6 corresponding to the SW channel.

The display unit 23 is formed of, for example, a liquid crystal panel, and displays various kinds of information.

The content storage unit 24 stores a multi-channel audio signal of audio content that supports a multi-channel (in this embodiment, 5.1 channels).

The test signal source sound storage unit 25 stores the source sound of the test signal.

The multi-channel audio reproduction unit 26 reproduces the multi-channel audio signal of the audio content stored in the content storage unit 24, and outputs, for each channel, a reproduced signal from the speaker 3 corresponding to the channel. The multi-channel audio reproduction unit 26 also reproduces the source sound of the test signal stored in the test signal source sound storage unit 25, and outputs the reproduced signal from the speaker 3 corresponding to the channel designated by the user through the controller 8.

The acoustic profile information storage unit 27 stores the acoustic profile information that defines the reproduction condition for the multi-channel audio signal of the audio content stored in the content storage unit 24, for each channel of the multi-channel audio signal.

The search request unit 28 transmits the search request to the acoustic profile information generating server 4 based on the search operation received from the user through the controller 8.

The selection notification unit 29 transmits the selection request accompanied by the designation of the wireless recording and reproducing terminal 5 selected as the measurement microphone to the acoustic profile information generating server 4 based on the selection operation for the measurement microphone, which has been received from the user through the controller 8. The selection notification unit 29 also transmits the selection cancellation request accompanied by the designation of the wireless recording and reproducing terminal 5 selected as the measurement microphone to the acoustic profile information generating server 4 based on a selection cancellation operation for the measurement microphone, which has been received from the user through the controller 8.

The test signal reproducing instruction unit 30 transmits the test signal reproducing instruction accompanied by the designation of the channel selected as a reproduction target to the wireless recording and reproducing terminal 5 selected as the measurement microphone based on the selection operation for the channel, which has been received from the user through the controller 8.

The main control unit 31 centrally controls the respective units 20 to 30 of the multi-channel audio device 2.

The functional configuration of the multi-channel audio device 2 illustrated in FIG. 8 may be implemented by hardware through use of an integrated logic IC, such as an ASIC or an FPGA, or may be implemented by software through use of a computer, such as a DSP. As another example, the functional configuration may be implemented by a general computer, such as a PC, including a CPU, a memory, a flash memory, a hard disk drive, or another auxiliary storage device, a wireless LAN adaptor or another communication device, and a speaker, causing the CPU to load a predetermined program into the memory from the auxiliary storage device and execute the program.

Figure 9:
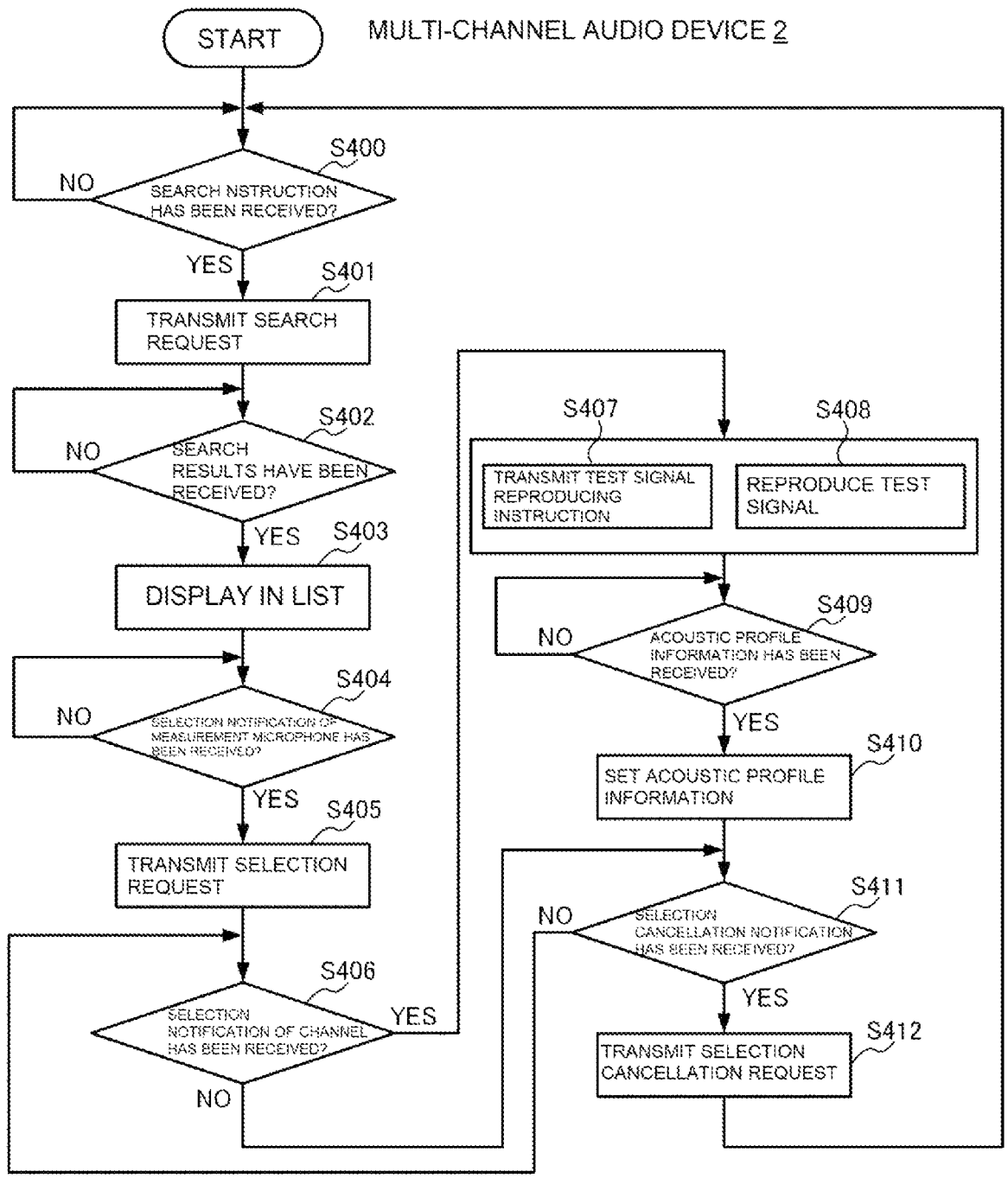
FIG. 9 is a flow chart for illustrating an acoustic profile setting operation of the multi-channel audio device (2).

FIG. 9 is a flow chart for illustrating an acoustic profile setting operation of the multi-channel audio device 2.

When the main control unit 31 receives the search instruction from the controller 8 through the controller interface unit 21 ("YES" in Step S400), the main control unit 31 instructs the search request unit 28 to search for the measurement microphone. In response thereto, the search request unit 28 transmits the search request to the acoustic profile information generating server 4 through the wireless network interface unit 20 (Step S401).

Subsequently, when the main control unit 31 receives the search results from the acoustic profile information generating server 4 through the wireless network interface unit 20 ("YES" in Step S402), the main control unit 31 displays, in a list, the information on the wireless recording and reproducing terminals 5 that can be used as the measurement microphone, which is included in the received search results, on the display unit 23 (Step S403). Then, when the main control unit 31 receives a selection notification of the measurement microphone from the controller 8 through the controller interface unit 21 ("YES" in Step S404), the main control unit 31 notifies the selection notification unit 29 of the wireless recording and reproducing terminal 5 designated by the received selection notification to instruct the selection of the wireless recording and reproducing terminal 5 to be used as the measurement microphone. In response thereto, the selection notification unit 29 transmits the selection request accompanied by the designation of the wireless recording and reproducing terminal 5 to be used as the measurement microphone to the acoustic profile information generating server 4 through the wireless network interface unit 20 (Step S405).

Subsequently, when the main control unit 31 receives a selection notification of the channel from the controller 8 through the controller interface unit 21 ("YES" in Step S406), the main control unit 31 notifies the test signal reproducing instruction unit 30 of the channel designated by the received selection notification of the channel together with the wireless recording and reproducing terminal 5 designated by the selection notification of the measurement microphone received in Step S404 to instruct the test signal reproducing instruction unit 30 to transmit the test signal reproducing instruction. The main control unit 31 also reads out the source sound of the test signal stored in the test signal source sound storage unit 25, and notifies the multi-channel audio reproduction unit 26 of the source sound of the test signal together with the channel designated by the selection notification of the channel to instruct the reproduction of the test signal.

In response thereto, the test signal reproducing instruction unit 30 transmits the test signal reproducing instruction accompanied by the designation of the channel designated by the selection notification of the channel to the wireless recording and reproducing terminal 5 designated by the selection notification of the measurement microphone through the wireless network interface unit 20 (Step S407). Meanwhile, the multi-channel audio reproduction unit 26 reproduces the source sound of the test signal, and outputs the source sound from the speaker 3 corresponding to the channel designated by the selection notification of the channel through the speaker connection unit 22 (Step S408).

Subsequently, when the main control unit 31 receives the acoustic profile information on the designated channel from the acoustic profile information generating server 4 through the wireless network interface unit 20 ("YES" in Step S409), the main control unit 31 stores the received acoustic profile information in the acoustic profile information storage unit 27 in association with the designated channel. Thus, the received acoustic profile information is set as the reproduction condition for the audio signal of the designated channel (Step S410).

Further, when the main control unit 31 receives a selection cancellation notification of the measurement microphone from the controller 8 through the controller interface unit 21 ("YES" in Step S411), the main control unit 31 instructs the selection notification unit 29 to cancel the selection. In response thereto, the selection notification unit 29 transmits the selection cancellation request accompanied by the designation of the wireless recording and reproducing terminal 5 selected as the measurement microphone to the acoustic profile information generating server 4 through the wireless network interface unit 20 (Step S412), and then the process returns to Step S400.

Next, an operation for reproducing a multi-channel audio signal to be performed by the multi-channel audio device 2 is described.

When the main control unit 31 receives a reproducing instruction accompanied by the designation of audio content from the controller 8 through the controller interface unit 21, the main control unit 31 reads out a multi-channel audio signal of the designated audio content from the content storage unit 24, and passes the multi-channel audio signal to the multi-channel audio reproduction unit 26. In response thereto, the multi-channel audio reproduction unit 26 reproduces, for each channel of the multi-channel audio signal, the audio signal of the corresponding channel based on the acoustic profile information (including the reproduction timing and the volume level) on the corresponding channel, which is stored in the acoustic profile information storage unit 27. Then, the multi-channel audio reproduction unit 26 outputs, for each channel of the multi-channel audio signal, the reproduced signal from the speaker 3 corresponding to the channel through the speaker connection unit 22.

One embodiment of the present invention has been described above.

In this embodiment, the wireless recording and reproducing terminal 5 provided with the recording and reproducing function, such as a smart speaker, a smartphone, or a tablet PC, is used as the measurement microphone, and hence a dedicated measurement microphone is not required to be attached to the multi-channel audio device 2. It also suffices that the user places the wireless recording and reproducing terminal 5 to be used as the measurement microphone at the listening point of the multi-channel audio device 2, and the user is not required to connect the wireless recording and reproducing terminal 5 and the multi-channel audio device 2 by a cord. In addition, the acoustic profile information is generated by the acoustic profile information generating server 4 provided separately from the multi-channel audio device 2, and hence the multi-channel audio device 2 is not required to have a processing capability required for generating acoustic profile information.

Therefore, according to this embodiment, it is possible to generate the acoustic profile information on a multi-channel audio signal by a simple operation without increasing a cost of the multi-channel audio device 2.

Further, in this embodiment, the multi-channel audio device 2 transmits the search request to the acoustic profile information generating server 4 based on the search operation received from the user through the controller 8, acquires the search results from the acoustic profile information generating server 4 to display the search results in a list, and transmits the selection request for the measurement microphone, which is accompanied by the designation of the wireless recording and reproducing terminal 5 selected by the user through the controller 8, to the acoustic profile information generating server 4.

Meanwhile, the acoustic profile information generating server 4 broadcasts the inquiry about the measurement microphone to the network 6 based on the search request received from the multi-channel audio device 2 through the network 6, to thereby search for the wireless recording and reproducing terminals 5 that can communicate to/from the own device 4 and the multi-channel audio device 2 and can be used as the measurement microphone, and notifies the multi-channel audio device 2 of the search results. The acoustic profile information generating server 4 also manages the wireless recording and reproducing terminal 5 designated by the selection request for the measurement microphone, which has been received from the multi-channel audio device 2, in association with this multi-channel audio device 2. Then, when the acoustic profile information generating server 4 receives the measurement data on the designated channel, the acoustic profile information generating server 4 transmits the acoustic profile information on the designated channel generated based on the measurement data to the multi-channel audio device 2 managed in association with the wireless recording and reproducing terminal 5 that has transmitted the received measurement data.

Therefore, according to this embodiment, when there are a plurality of wireless recording and reproducing terminals 5 that can be used as the measurement microphone, the user can use a desired wireless recording and reproducing terminal 5 as the measurement microphone, thereby improving workability in generating the acoustic profile information.

Further, in this embodiment, the acoustic profile information generating server 4 transmits the measurement mode shift request accompanied by the designation of the multi-channel audio device 2 to the wireless recording and reproducing terminal 5 designated by the selection request received from the multi-channel audio device 2. Meanwhile, the wireless recording and reproducing terminal 5 shifts, based on the measurement mode shift request received from the acoustic profile information generating server 4, to the measurement mode for waiting until the test signal reproducing instruction is transmitted from the multi-channel audio device 2 designated by the measurement mode shift request.

Therefore, according to this embodiment, the wireless recording and reproducing terminal 5 waiting for the test signal reproducing instruction can quickly start the recording processing for the channel reproduction data and the source sound reproduction data when the wireless recording and reproducing terminal 5 receives the test signal reproducing instruction, and hence a recording start timing for the channel reproduction data and a recording start timing for the source sound reproduction data can be matched with higher accuracy.

The present invention is not limited to the above-mentioned embodiment, and a large number of modifications can be made within the scope of the gist thereof.

For example, in the above-mentioned embodiment, the acoustic profile information generating server 4 broadcasts the inquiry about the measurement microphone to the network 6 to search for the wireless recording and reproducing terminals 5, and notifies the multi-channel audio device 2 of the search results. However, the present invention is not limited thereto. The multi-channel audio device 2 may search for the wireless recording and reproducing terminals 5. That is, the multi-channel audio device 2 broadcasts the inquiry about the measurement microphone through the access point 7 based on the search operation received from the user through the controller 8, to thereby search for the wireless recording and reproducing terminals 5 that can communicate to/from the own device 2 and the acoustic profile information generating server 4 and can be used as the measurement microphone. Then, the multi-channel audio device 2 displays the search results in a list, and transmits the selection request for the measurement microphone, which is accompanied by the designation of the wireless recording and reproducing terminal 5 selected by the user through the controller 8, to the acoustic profile information generating server 4.

Meanwhile, the acoustic profile information generating server 4 manages the wireless recording and reproducing terminal 5 designated by the selection request for the measurement microphone, which has been received from the multi-channel audio device 2, in association with this multi-channel audio device 2. Then, when the acoustic profile information generating server 4 receives the measurement data on the designated channel, the acoustic profile information generating server 4 transmits the acoustic profile information on the designated channel generated based on the measurement data to the multi-channel audio device 2 managed in association with the wireless recording and reproducing terminal 5 that has transmitted the received measurement data.

Further, in the above-mentioned embodiment, the communication between the multi-channel audio device 2 and the wireless recording and reproducing terminal 5 is performed through the access point 7, but the present invention is not limited thereto. Direct wireless communication may be performed between the multi-channel audio device 2 and the wireless recording and reproducing terminal 5 by short-range wireless communication, such as Bluetooth (trademark).

Further, in the above-mentioned embodiment, the wireless recording and reproducing terminal 5 may also have the function of the controller 8. Further, the wireless recording and reproducing terminal 5 may also have the function of the acoustic profile information generating server 4.

REFERENCE SIGNS LIST

1: multi-channel audio system, 2: multi-channel audio device
3-1 to 3-6: speaker 4: acoustic profile information generating server
5, 5-1 to 5-3: wireless recording and reproducing terminal,
6: network
7: access point, 8: controller
20: wireless network interface unit
21: controller interface unit, 22: speaker connection unit,
23: display unit
24: content storage unit, 25: test signal source sound storage unit
26: multi-channel audio reproduction unit, 27: acoustic profile information storage unit
28: search request unit, 29: selection notification unit,
30: test signal reproducing instruction unit
31: main control unit, 40: network interface unit
41: inquiry transmission unit, 42: search result transmission unit
43: measurement mode shift request transmission unit,
44: pair management unit, 45: measurement unit
46: acoustic profile information generating unit, 47: acoustic profile information transmission unit
48: main control unit, 50: wireless network interface unit
51: search request response unit, 52: microphone, 53: test signal source sound storage unit
54: channel reproduction data recording unit, 55: source sound reproduction data recording unit
56: measurement data transmission unit, 57: main control unit

The invention claimed is:

1. A multi-channel audio system, comprising:
a multi-channel audio device configured to reproduce a multi-channel audio signal through use of a plurality of speakers;
an acoustic profile information generating device configured to generate acoustic profile information to be set in the multi-channel audio device; and
a wireless recording and reproducing device configured to cooperate with the acoustic profile information generating device, the wireless recording and reproducing device being placed at a listening point of the multi-channel audio device,
wherein the wireless recording and reproducing device includes:
  channel reproduction data recording means for enabling, when a test signal reproducing instruction accompanied by designation of a channel is received from the multi-channel audio device, a microphone provided to or connected to the own wireless recording and reproducing device to start sound collection, and recording, as channel reproduction data on the designated channel, a test signal output from the multi-channel audio device through one of the plurality of speakers corresponding to the designated channel;
  source sound reproduction data recording means for reproducing, when the test signal reproducing instruction is received, a source sound of the test signal, which is stored in advance, in synchronization with the start of the sound collection by the microphone, and recording reproduced data on the source sound as source sound reproduction data without externally outputting the reproduced data; and
  measurement data transmission means for transmitting, to the acoustic profile information generating device, measurement data on the designated channel, which includes the channel reproduction data on the designated channel, which has been recorded by the channel reproduction data recording means, and the source sound reproduction data recorded by the source sound reproduction data recording means,
wherein the acoustic profile information generating device includes:
  measurement data receiving means for receiving the measurement data on the designated channel from the wireless recording and reproducing device;
  measurement means for comparing the channel reproduction data and the source sound reproduction data that are included in the measurement data on the designated channel, which has been received by the measurement data receiving means, to each other to measure a delay time and an attenuation rate of the channel reproduction data on the designated channel with respect to the source sound reproduction data;
  acoustic profile information generating means for generating acoustic profile information on the designated channel, which includes a reproduction timing and a volume level, based on the delay time and the attenuation rate of the channel reproduction data on the designated channel with respect to the source sound reproduction data, which have been measured by the measurement means; and acoustic profile information transmitting means for transmitting the acoustic profile information on the designated channel, which has been generated by the acoustic profile information generating means, to the multi-channel audio device, and wherein the multi-channel audio device includes:

acoustic profile information receiving means for receiving the acoustic profile information on the designated channel from the acoustic profile information generating device;

acoustic profile information setting means for setting the acoustic profile information on the designated channel, which has been received by the acoustic profile information receiving means, as a reproduction condition for an audio signal of the designated channel;

test signal reproduction instruction means for transmitting, based on a test signal reproducing operation received from a user, the test signal reproducing instruction accompanied by the designation of the channel to the wireless recording and reproducing device; and test signal reproduction means for reproducing, based on the test signal reproducing operation, the source sound of the test signal, which is stored in advance, and outputting the source sound from the one of the plurality of speakers corresponding to the designated channel.

2. The multi-channel audio system according to claim 1, wherein the acoustic profile information generating device further includes:

search means for searching, based on a search request received from the multi-channel audio device, for the wireless recording and reproducing devices communicable to/from the own acoustic profile information generating device and the multi-channel audio device;

search result notification means for notifying the multi-channel audio device of search results including the wireless recording and reproducing devices retrieved by the search means; and pair management means for managing the wireless recording and reproducing device designated by a selection request received from the multi-channel audio device in association with the multi-channel audio device, wherein the multi-channel audio device further includes:

search result acquisition means for transmitting the search request to the acoustic profile information generating device based on a search operation received from the user, and acquiring the search results from the acoustic profile information generating device; and selection notification means for transmitting, to the acoustic profile information generating device, the selection request accompanied by the designation of the wireless recording and reproducing device selected by the user from among the search results acquired by the search result acquisition means, and wherein the acoustic profile information transmitting means is configured to transmit the acoustic profile information on the designated channel, which has been generated by the acoustic profile information generating means, to the multi-channel audio device managed by the pair management means in association with the wireless recording and reproducing device that has transmitted the measurement data on the designated channel, which has been received by the measurement data receiving means.

3. The multi-channel audio system according to claim 2, wherein the acoustic profile information generating device further includes measurement mode shift request transmission means for transmitting a measurement mode shift request accompanied by the designation of the multi-channel audio device to the wireless recording and reproducing device designated by the selection request received from the multi-channel audio device, and wherein the wireless recording and reproducing device is configured to shift, based on the measurement mode shift request received from the acoustic profile information generating device, to a measurement mode for waiting until the test signal reproducing instruction is transmitted from the multi-channel audio device designated by the measurement mode shift request.

4. The multi-channel audio system according to claim 1, wherein the multi-channel audio device further includes:

search means for searching, based on a search operation received from the user, for the wireless recording and reproducing devices communicable to/from the own multi-channel audio device and the acoustic profile information generating device; and selection notification means for transmitting, to the acoustic profile information generating device, a selection request accompanied by the designation of the wireless recording and reproducing device selected by the user from among the wireless recording and reproducing devices retrieved by the search means, wherein the acoustic profile information generating device further includes pair management means for managing the wireless recording and reproducing device designated by the selection request received from the multi-channel audio device in association with the multi-channel audio device, and wherein the acoustic profile information transmitting means is configured to transmit the acoustic profile information on the designated channel, which has been generated by the acoustic profile information generating means, to the multi-channel audio device managed by the pair management means in association with the wireless recording and reproducing device that has transmitted the measurement data on the designated channel, which has been received by the measurement data receiving means.

5. An acoustic profile information generating device for generating acoustic profile information to be set in a multi-channel audio device configured to reproduce a multi-channel audio signal through use of a plurality of speakers in cooperation with a wireless recording and reproducing device configured to record a test signal output from the multi-channel audio device, the wireless recording and reproducing device being placed at a listening point of the multi-channel audio device, the acoustic profile information generating device comprising:

measurement data receiving means for receiving, from the wireless recording and reproducing device, measurement data on a designated channel, which includes: channel reproduction data being recorded data of the test signal output from the multi-channel audio device through one of the plurality of speakers corresponding to the designated channel; and source sound reproduction data being recorded data of the test signal reproduced by the wireless recording and reproducing device in synchronization with the reproduction of the test signal by the multi-channel audio device;

measurement means for comparing the channel reproduction data and the source sound reproduction data that are included in the measurement data on the designated channel, which has been received by the measurement data receiving means, to each other to measure a delay time and an attenuation rate of the channel reproduction data on the designated channel with respect to the source sound reproduction data;

acoustic profile information generating means for generating acoustic profile information on the designated channel, which includes a reproduction timing and a volume level, based on the delay time and the attenuation rate of the channel reproduction data with respect to the source sound reproduction data, which have been measured by the measurement means; and acoustic profile information transmitting means for transmitting the acoustic profile information on the designated channel, which has been generated by the acoustic profile information generating means, to the multi-channel audio device.

6. A wireless recording and reproducing device for cooperating with an acoustic profile information generating device configured to generate acoustic profile information to be set in a multi-channel audio device configured to reproduce a multi-channel audio signal through use of a plurality of speakers, the wireless recording and reproducing device being placed at a listening point of the multi-channel audio device, the wireless recording and reproducing device comprising:

channel reproduction data recording means for enabling, when a test signal reproducing instruction accompanied by designation of a channel is received from the multi-channel audio device, a microphone provided to or connected to the own wireless recording and reproducing device to start sound collection, and recording, as channel reproduction data on the designated channel, a test signal output from the multi-channel audio device through one of the plurality of speakers corresponding to the designated channel;

source sound reproduction data recording means for reproducing, when the test signal reproducing instruction is received, a source sound of the test signal, which is stored in advance, in synchronization with the start of the sound collection by the microphone, and recording reproduced data on the source sound as source sound reproduction data without externally outputting the reproduced data; and measurement data transmission means for transmitting, to the acoustic profile information generating device, measurement data on the designated channel, which includes the channel reproduction data on the designated channel, which has been recorded by the channel reproduction data recording means, and the source sound reproduction data recorded by the source sound reproduction data recording means.

7. A program stored on a non-transitory computer-readable medium, executable by a computer, the program causing the computer to function as an acoustic profile information generating device for generating acoustic profile information to be set in a multi-channel audio device configured to reproduce a multi-channel audio signal through use of a plurality of speakers in cooperation with a wireless recording and reproducing device configured to record a test signal output from the multi-channel audio device, the wireless recording and reproducing device being placed at a listening point of the multi-channel audio device, the acoustic profile information generating device including:

measurement data receiving means for receiving, from the wireless recording and reproducing device, measurement data on a designated channel, which includes:

channel reproduction data being recorded data of the test signal output from the multi-channel audio device through one of the plurality of speakers corresponding to the designated channel; and source sound reproduction data being recorded data of the test signal reproduced by the wireless recording and reproducing device in synchronization with the reproduction of the test signal by the multi-channel audio device;

measurement means for comparing the channel reproduction data and the source sound reproduction data that are included in the measurement data on the designated channel, which has been received by the measurement data receiving means, to each other to measure a delay time and an attenuation rate of the channel reproduction data on the designated channel with respect to the source sound reproduction data;

acoustic profile information generating means for generating acoustic profile information on the designated channel, which includes a reproduction timing and a volume level, based on the delay time and the attenuation rate of the channel reproduction data with respect to the source sound reproduction data, which have been measured by the measurement means; and acoustic profile information transmitting means for transmitting the acoustic profile information on the designated channel, which has been generated by the acoustic profile information generating means, to the multi-channel audio device.

8. A program stored on a non-transitory computer-readable medium, executable by a computer, the program causing the computer to function as a wireless recording and reproducing device for cooperating with an acoustic profile information generating device configured to generate acoustic profile information to be set in a multi-channel audio device configured to reproduce a multi-channel audio signal through use of a plurality of speakers, the wireless recording and reproducing device being placed at a listening point of the multi-channel audio device, the wireless recording and reproducing device including:

channel reproduction data recording means for enabling, when a test signal reproducing instruction accompanied by designation of a channel is received from the multi-channel audio device, a microphone provided to or connected to the own wireless recording and reproducing device to start sound collection, and recording, as channel reproduction data on the designated channel, a test signal output from the multi-channel audio device through one of the plurality of speakers corresponding to the designated channel;

source sound reproduction data recording means for reproducing, when the test signal reproducing instruction is received, a source sound of the test signal, which is stored in advance, in synchronization with the start of the sound collection by the microphone, and recording reproduced data on the source sound as source sound reproduction data without externally outputting the reproduced data; and measurement data transmission means for transmitting, to the acoustic profile information generating device, measurement data on the designated channel, which includes the channel reproduction data on the designated channel, which has been recorded by the channel reproduction data recording means, and the source sound reproduction data recorded by the source sound reproduction data recording means.

9. A method of generating acoustic profile information, in which a wireless recording and reproducing device placed at a listening point of a multi-channel audio device configured to reproduce a multi-channel audio signal through use of a plurality of speakers and an acoustic profile information generating device communicable to/from the multi-channel audio device and the wireless recording and reproducing device are used to generate acoustic profile information to be set in the multi-channel audio device, the method comprising:

transmitting, by the multi-channel audio device, when a test signal reproducing operation accompanied by designation of a channel is received from a user, a test signal reproducing instruction accompanied by the designation of the channel to the wireless recording and reproducing device, as well as reproducing a source sound of a test signal, which is stored in advance, to output the source sound from one of the plurality of speakers corresponding to the designated channel;

enabling, by the wireless recording and reproducing device, when the test signal reproducing instruction is received from the multi-channel audio device, a microphone provided to or connected to the own wireless recording and reproducing device to start sound collection, and recording the test signal output from the multi-channel audio device through the one of the plurality of speakers corresponding to the designated channel as channel reproduction data on the channel designated by the test signal reproducing instruction, as well as reproducing the source sound of the test signal, which is stored in advance, in synchronization with the start of the sound collection by the microphone, recording reproduced data on the source sound as source sound reproduction data without externally outputting the reproduced data, and transmitting measurement data on the designated channel, which includes the channel reproduction data and the source sound reproduction data, to the acoustic profile information generating device;

comparing, by the acoustic profile information generating device, when the measurement data on the designated channel is received from the wireless recording and reproducing device, the channel reproduction data and the source sound reproduction data that are included in the measurement data on the designated channel to each other to measure a delay time and an attenuation rate of the channel reproduction data on the designated channel with respect to the source sound reproduction data, generating, based on results of the measurement, the acoustic profile information including a reproduction timing and a volume level of the designated channel, and transmitting the acoustic profile information on the designated channel to the multi-channel audio device; and setting, by the multi-channel audio device, when the acoustic profile information on the designated channel is received from the acoustic profile information generating device, the acoustic profile information on the designated channel as a reproduction condition for an audio signal of the designated channel.

10. A method of generating acoustic profile information using a wireless recording and reproducing device placed at a listening point of a multi-channel audio device configured to reproduce a multi-channel audio signal through use of a plurality of speakers, the method comprising:

outputting a source sound of a test signal from one of the plurality of speakers corresponding to a designated channel of the multi-channel audio device;

recording, by the wireless recording and reproducing device at the listening point, the source sound of the test signal output from the multi-channel audio device through the one of the plurality of speakers corresponding to the designated channel as channel reproduction data for the channel;

reproducing, by the wireless recording and reproducing device at the listening point, the source sound of the test signal in synchronization with the output source sound of the test signal by the multi-channel audio device;

recording, by the wireless recording and reproducing device at the listening point, the source sound of the test signal reproduced by the wireless recording and reproducing device as source sound reproduction data; and comparing the channel reproduction data and the source sound reproduction data to each other to measure a delay time and/or an attenuation rate of the channel reproduction data on the designated channel with respect to the source sound reproduction data, and generating, based on results of the measurement, the acoustic profile information including a reproduction timing and/or a volume level of the designated channel.

11. The method according to claim 10, comprising generating a test signal instruction accompanied by a designation of the channel, wherein the multi-channel audio device outputs the source sound of the test signal from the one of the plurality of speakers corresponding to the designated channel in response to the test signal instruction, and wherein the wireless recording and reproducing device reproduces the source sound of the test signal in response to the test signal instruction.

12. The method according to claim 11, wherein the test signal instruction is based at least in part on a selection of a channel received from a user.

13. The method according to claim 10, comprising transmitting the channel reproduction data and the source sound reproduction data from the wireless recording and reproducing device to an acoustic profile information generating device, wherein the acoustic profile information generating device compares the channel reproduction data and the source sound reproduction data and generates the acoustic profile information.

14. The method according to claim 10, comprising setting the acoustic profile information on the designated channel as a reproduction condition for an audio signal of the designated channel.

15. Program instructions stored on a non-transitory computer-readable medium, executable by one or more computer processors, the program instructions configured to cause the one or more computer processors to generate acoustic profile information for a multi-channel audio device configured to reproduce a multi-channel audio signal through use of a plurality of speakers by:

recording, by a wireless recording and reproducing device placed at a listening point of the multi-channel audio device, a source sound of a test signal output from one of the plurality of speakers corresponding to a designated channel of the multi-channel audio device as channel reproduction data for the channel;

reproducing, by the wireless recording and reproducing device at the listening point, the source sound of the test signal in synchronization with the output source sound of the test signal by the multi-channel audio device;

recording, by the wireless recording and reproducing device at the listening point, the source sound of the test signal reproduced by the wireless recording and reproducing device as source sound reproduction data; and comparing the channel reproduction data and the source sound reproduction data to each other to measure a delay time and/or an attenuation rate of the channel reproduction data on the designated channel with respect to the source sound reproduction data, and generating, based on results of the measurement, the acoustic profile information including a reproduction timing and/or a volume level of the designated channel.

16. The program instructions according to claim 15, wherein the program instructions are configured to cause the one or more computer processors to generate a test signal instruction accompanied by a designation of the channel, so that the multi-channel audio device outputs the source sound of the test signal from the one of the plurality of speakers corresponding to the designated channel in response to the test signal instruction, and so that the wireless recording and reproducing device reproduces the source sound of the test signal in response to the test signal instruction.

17. The program instructions according to claim 16, wherein the test signal instruction is based at least in part on a selection of a channel received from a user.

18. The program instructions according to claim 15, wherein the program instructions are configured to cause the one or more computer processors to transmit the channel reproduction data and the source sound reproduction data from the wireless recording and reproducing device to an acoustic profile information generating device, and to cause the acoustic profile information generating device to compare the channel reproduction data and the source sound reproduction data and generate the acoustic profile information.

19. The program instructions according to claim 15, wherein the program instructions are configured to cause the one or more computer processors to set the acoustic profile information on the designated channel as a reproduction condition for an audio signal of the designated channel.

20. The program instructions according to claim 15, wherein the program instructions are configured to cause the one or more computer processors to measure the delay time and the attenuation rate of the channel reproduction data on the designated channel with respect to the source sound reproduction data, and generate, based on results of the measurement, the acoustic profile information including the reproduction timing and the volume level of the designated channel.

* * * * *